United States Patent [19]
Rymes

[11] 3,971,019
[45] July 20, 1976

[54] RECEIVER APPARATUS

[76] Inventor: William H. Rymes, Center Ossipee, N.H. 03864

[22] Filed: June 14, 1973

[21] Appl. No.: 370,139

[52] U.S. Cl. .................................. 343/7.4; 343/10; 343/117 R
[51] Int. Cl.² ..................... G01S 3/38; G01S 9/02
[58] Field of Search .................. 343/7.4, 10, 117 R

[56] References Cited
UNITED STATES PATENTS

| | | | |
|---|---|---|---|
| 2,468,751 | 5/1949 | Hansen et al. | 343/7.4 |
| 3,137,853 | 6/1964 | Cutler | 343/117 R X |
| 3,162,851 | 12/1964 | Kamen et al. | 343/117 R X |
| 3,171,094 | 2/1965 | Geren et al. | 340/3 E X |
| 3,365,715 | 1/1968 | Stoney | 343/7.4 |
| 3,453,617 | 7/1969 | Begeman et al. | 343/7.4 |

Primary Examiner—Malcolm F. Hubler
Attorney, Agent, or Firm—R. Sciascia; R. Beers; S. Sheinbein

[57] ABSTRACT

A communications or radar radio receiver, of modified superheterodyne design, that will accept and process unknown radio frequency (R.F.) signals without the necessity of concurrent tuning of the R.F. stage(s) and adjustment of the local oscillator to a frequency proportional to the carrier frequency. The radio receiver employs a rotatable directional receiving antenna having adequate directivity indices to isolate and discriminate between adjacent signals in angular coordinates. When used in radar receiver applications in combination with an off-set frequency transponder, range and bearing can be obtained without resorting to a common specific frequency requirement for both radar and transponder. In such a case the servo of the radar receiver is used to position the antenna for detection of the carrier signal thereby providing an azimuth indication of the position of the unknown transmitter. If the receiver does not have a servo, the antenna can be selectively rotated by some other means for a maximum received signal to indicate azimuth.

1 Claim, 2 Drawing Figures

RECEIVER APPARATUS

STATEMENT OF GOVERNMENT INTEREST

The invention described herein may be manufactured and used by or for governmental purposes without the payment of any royalties thereon or therefor.

BACKGROUND OF THE INVENTION

The present invention relates generally to superheterodyne receivers and, more particularly to an apparatus and method for processing Radio Frequency signal voltages, both pulse and amplitude modulated, of unknown frequency. Such processing is accomplished without the need for complex tuning mechanisms to generate a tracking local oscillator signal having a frequency proportional to the unknown signal frequency. The present invention obtains signal selectivity by means of a directional antenna whereas the prior art requires selectivity by means of manual frequency tuning of radio frequency state(s) and concurrent adjusting of the receiver's local oscillator. For certain applications such as radar search and for radio monitoring, manual tuning consumes more time than can be tolerated to isolate signal frequencies versus direction.

The prior art requires a receiver equipped with an antenna to be tuned in incremental stages to detect a desired signal. In the case wherein a directional antenna is used, tuning of the entire frequency band of the receiver must be accomplished for each angular increment of antenna position or vice-versa. The prior art of using radar with superheterodyne receivers for air-sea rescue and other beacon or transponder uses requires that each radar involved be tuned to the exact same frequency or that a separate local oscillator be used that is pre-set to a specific frequency that all transponders are set to. These requirements are overly stringent because of the requirements of stability for both the transponders and local oscillators that must be maintained at specific frequencies and the strong transponder reply necessary to overcome reflected clutter. In the present invention the local oscillator signal is generated automatically as a product of the unknown received signal and a fixed-pretuned stable oscillator whereas the prior art requires search tuning to generate the correct local oscillator signal that must track with the RF antenna tuning. The prior art for radar application samples the transmitted signal in setting the local oscillator frequency. As a result, for both radar and radio applications, the IF bandpass must be wide enough to accomodate various drifts in frequency and tracking as well as doppler changes in signal frequencies to significantly affect the gain-bandwidth product that establishes receiver sensitivity. This is not germane to the present invention as the required bandwidth is merely a function of pulsewidth and/or modulation side bands.

SUMMARY OF INVENTION

Accordingly, it is an object of the present invention to process radio frequency signals of unknown frequency without varying the frequency tuning the heterodyne receiver apparatus. It is also an object to accomplish this improvement when used in combination with an antenna or transducer having directional characteristics, known to the art, to attenuate unwanted signals.

Another object of this invention is to locate unknown transmitted signals by directional scanning alone rather than a combination of directional scanning and frequency tuning for each full cycle of antenna rotation.

Still another object of this invention is the provision of a simple modification to add an alternate source of local oscillator signal for an airborne radar receiver for the purpose of detecting and tracking a beacon pulse such as is used in air-sea rescue, inflight rendevous, inflight refueling and aircraft carrier return of aircraft without the usual requirement to tune all transponders and radars to the same specific frequency.

A further object is to provide a means to utilize a shipboard navigation radar to locate transmittal buoys equipped to selectively display a clutter-free position of each buoy in range and bearing, yet selectively retain the original radar function of normal radars, local oscillation or the processing circuit of this invention.

Still another object is to provide an airport runway radar with a positive and clutter free means of guiding transponder equipped aircraft to a safe glide path landing without the usual glint and scintillation associated with prior-art radar return signals and/or complex tuning or resorting to common specific operating frequencies.

Not all objectives have been cited herein nor have all advantages and novel features. These will become apparent from the following description of the invention when considered in conjunction with the accompanying drawings.

These and other objects of the invention are realized by a method and apparatus for receiving periodically varying signals wherein a portion of the received signal is mixed with a local signal of a known fixed frequency. The resulting signals are then combined with the another portion of the received signal. This produces a signal with an intermediate frequency equal to the known fixed frequency. The amplitude modulation on this signal is detected and the antenna rotated for a maximum signal. When the antenna is positioned for maximum signal, it provides an azimuth indication of the transmitter. Frequency tuning is not necessary to receive the signal in the heterodyne receiver. When utilized with a rotatable directional antenna, the receiver can thus be used to determine the direction of a transmitter or beacon without the need to frequency-tune.

When this method and apparatus is applied to a radar receiver a simple conversion of the receiver will enable the operator to selectively operate the receiver as a conventional radar receiver or as a homing device utilizing the rotatable directional radar antenna. When operating as a homing or direction finding device the unknown received signal can be processed without the normally required frequency-tuning search of the heterodyne receiver.

GENERAL DESCRIPTION

Figure 1:
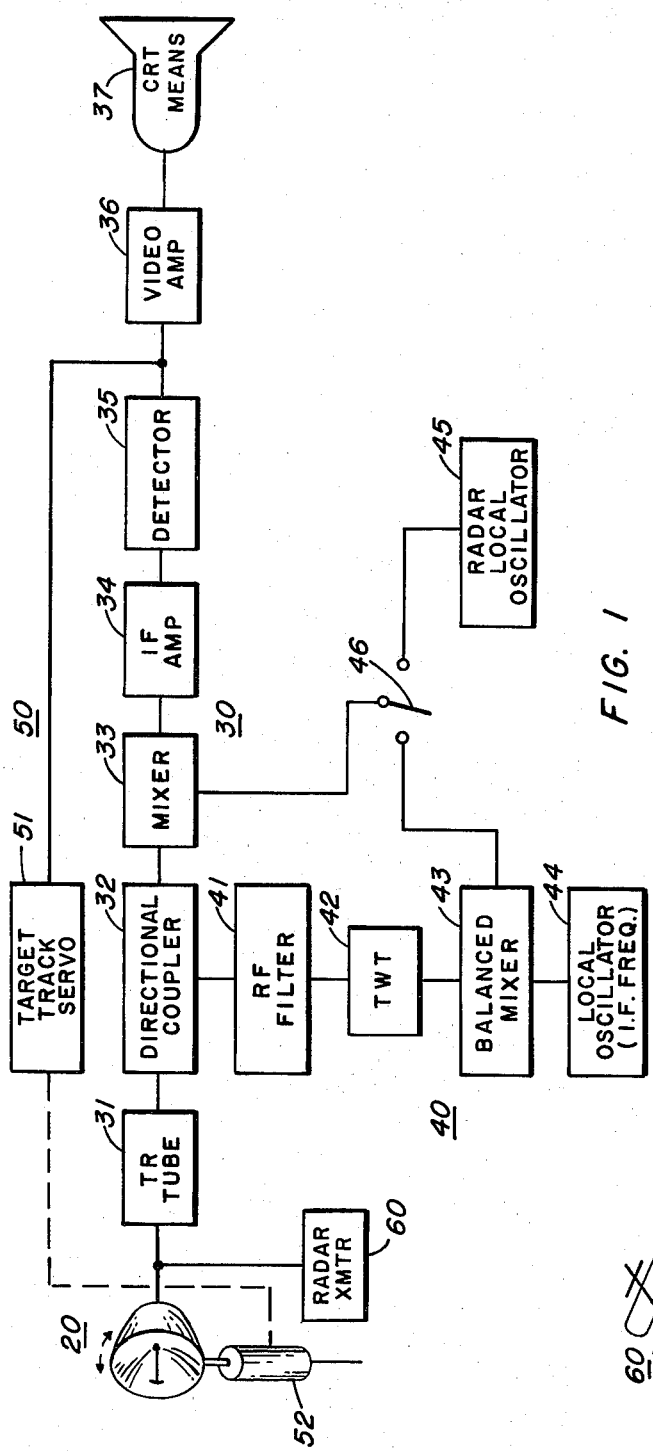
FIG. 1 illustrates a radio frequency receiver embodying the invention.

In the embodiment shown in the drawings a broadband directional antenna 20 is rotated or scanned (without frequency tuning) thus providing a received signal with a frequency of $f_r$ to the RF channel 30. The received signal having a frequency $f_r$ is sampled and fed into local oscillator channel 40 and mixed in a balanced mixer. This produces two sidebands having frequencies $f_r + $ IF and $f_r - $ IF where IF is the intermediate frequency of the RF channel 30. These two sidebands are then mixed in channel 30 with the received signal thus producing two additive signals having a frequency equal to the IF frequency. The antenna is rotated manually or by a servo so that this resulting signal is a maximum. At maximum signal the position of the antenna will indicate the direction of the transmitter. All this is done without any frequency tuning in channel 30 or channel 40.

DETAILED DESCRIPTION OF INVENTION

First Embodiment

Although this description employs a beacon transponder generally, specific uses and applications of the present invention will be cited at the conclusion. When a beacon transponder is activated by a radar signal, a new signal, offset in frequency, is generated and transmitted from its antenna, usually isotropically. This signal, having an unknown frequency within the limitations of the radar antenna and its waveguide, is processed by the circuit of the present invention without the complex preselected tuning that is normally required.

The drawing illustrates an embodiment (FIG. 1) of the invention comprising an airborne radar system, as modified by the circuit of the present invention for processing a signal of unknown frequency. The pilot of the aircraft operates a switch 46 which is titled "Beacon/Radar." The pilot places the switch 46 in the "Beacon" position to disconnect local oscillator 45 of the radar system and to connect the signal processing circuit of the present invention to the standard radar system. An RF channel 30 has a directional coupler 32 located in the waveguide path between a transmit-receive tube 31 and a radar mixer 33, the radar mixer 33 being a portion of a conventional airborne radar system. A beacon transponder (not shown), transmits RF energy in the general direction of the aircraft. Signal transmitters, other than a beacon transponder, can be used with the present invention; use of a beacon transponder is by way of example only.

The directional coupler 32 samples the beacon pulse of unknown frequency received via a radar antenna 20 for processing by a local oscillator channel 40. An RF notch filter 41 of channel 40 is tuned to the frequency of the radar transmitted signal from the transmitter 60. At this stage, any reflected return signals from 60 are attenuated by filter 41 and the filtered beacon pulse is amplified by a broadband travelling wave tube 42 and is thereafter applied to a mixer 43. The output of a stable local oscillator 44, set at a frequency equal to the radar system's intermediate frequency of 30 MC (for example), is also applied to balanced microwave mixer 43. The balanced mixer 43 produces two sidebands having frequencies of $f_r + $ IF and $f_r - $ IF, where $f_r$ is the frequency of the received signal and IF is the IF frequency of channel 30. The processed beacon pulse is then applied through Beacon/Radar switch 46 to the mixer 33, which replaces the radar's local oscillator signal 45. At this point, frequencies of the processed beacon pulse are equal to the frequency of the received beacon pulse plus and minus the IF frequency. The processed beacon pulse is then mixed at the radar mixer 33 with the unsampled portion of the received beacon pulse. The result of the mixer action produces two signals of the same frequency that are in phase and additive and which equal the IF frequency. This additive effect improves the signal-to-noise ratio by combining the IF signals with no increase in noise. The additive signal is then ready to be processed in the usual manner via a standard IF amplifier 34, a detector 36, and a standard video amplifier 36 to CRT (cathode ray tube) means 37 which will present the beacon signal visually in range and bearing.

If desired, the beacon can be tracked in the usual manner of tracking a radar target in an all-weather environment. A conventional target-track servo loop 50 is conventionally connected between detector 35 and an antenna rotator 52 by way of a servo network 51. This servo 50 responds to signals from detector 35 to drive motor 52 so that the antenna provides a maximum output of the received signal. In so doing the antenna 20 is pointed in the direction of the transmitter such as a beacon. With switch 46 in the "Beacon" position, the sampled carrier is processed through an RF filter 41 to eliminate ground reflections and prevent them from interfering with the beacon transponder signal. The filtered signal is amplified by a broadband amplifier 42 such as a TWT (Travelling Wave Tube) and applied to one part of balanced mixer 43. Concurrently a stable oscillator signal from local oscillator 44 is applied to the other input of mixer 43 at a frequency equal to that of the IF (Intermediate Frequency) state(s). The product of mixer 43 consists of two sidebands, one equal to the carrier minus the IF frequency and the other equal to the carrier plus the IF frequency. These resultant signals are applied to the receiver mixer 33. The resulting action of this mixer cancels out both the unsampled carrier and the processed carrier $f_r$ and produces two signals equal in frequency to the IF and in electrical phase, these signals being additive. The signal processing circuit of the present invention thereby provides an output which can be processed in the conventional manner of a superheterodyne receiver. All other features and functions inherent in the receiver such as track, search display video processing, audio detection, etc. are not affected by this present invention.

Conventionally the radar transmitter 60 is connected to some means such as a deflection display circuit 61 that enables proper deflection of the CRT to provide a range display of the target. This means is included in CRT means 37, the term "CRT means" being intended generally to include, for example, the usual range, deflection and display components of a radar set, such as a sweep generator, a gate-pulse amplifier, a range-mark generator, a CRT, etc. These may be obtained from any general book on radar such as "Principles of Radar" by Reintjes and Coate, third Ed., published by the McGraw-Hill Book Company. (See the block diagram of a typical radar set on page 47, for example).

From the above description it is apparent that the present invention provides an improved system which is extremely simple in concept and operation, and yet accomplishes the objectives of permitting a received beacon signal of unknown frequency stability required in the prior art. It does not require high beacon transmitter power. Nor does it require means of frequency search in the receiver or a common frequency usage.

The invention outlined above has various applications based on the tracking of a beacon pulse in range and bearing. Thus, it could be adapted to act as a novel means of air/sea rescue or of locating targets. For example, in the employment of conventional weapons (bombs) from piloted aircraft, it is essential that an identification point (IP) be established when radar significant targets are beyond the performance capabilities of the airborne radar system. That is, when the airborne radar system is not a high resolution type or when the exact target location is not known, it becomes necessary to employ a forward observer with a beacon who knows the exact position of the target relative to him. The observer's position provides the necessary identification point (IP) and he provides the location of the target relative to the IP. This can be accomplished in various ways, such as the forward observer communicating with the pilot via portable radio and describing the target and its position relative to some prominent geographical landmark. This, of course, requires visual observance and in most cases of low overcast weather, effective bombing cannot be carried out. An alternative method, however, is to employ a device that provides a radar-significant IP on the radar scope of bombing aircraft, supplemented with voice communication providing the exact position of the target relative to the IP. Such a method would not only provide a more precise set of coordinates, but would also permit bombing to be carried out during periods when visual sighting is obscured by clouds.

The apparatus of the present invention, for processing a beacon signal, will accept a band of frequencies selected for a particular forward observer. Other forward observers will use other channels or bands and aircraft operating with those forward observers will plug in the RF notch filters 41 described herein to accommodate the beacon frequency bands selected. A channel will not be chosen with a band of frequencies that includes the transmitted radar signal. The Beacon/Radar switch 46 is pilot-selectable and is connected in the radar system so that either the radar local oscillator 45 is used or the beacon local oscillator 44 is used.

The radar transmitter 60 radiates through antenna 20 with TR tube 31 preventing this radiation from going through the channels 30 and 40 to prevent it from interfering with signal reception. The transmitter 60 is conventionally connected to some means such as a deflection and display circuit, that operates to display target range on the CRT.

In operation, the forward observer is on station using a beacon. The pilot of the aircraft searching for the particular forward observer, places the selector switch 46 in the "Beacon" position to prevent radar ground-return echoes from being processed by the radar system and thus prevent the ground-return from saturating the radar scope. (This saturation is normal when a pulse radar antenna is searching in a down look manner or when the antenna is directed at the ground).

Upon the illumination of the beacon by the radar pulse, which occurs as the antenna beam dwells on the beacon as it searches in azimuth, the beacon receiving the radar pulse automatically transmits RF energy back in the general direction of the searching aircraft. This received beacon signal is of unknown frequency but falls within the bandwidth of the RF waveguide filter. It is received by the narrow beam of the airborne radar antenna 20 and then progresses through the radar waveguide to the receiver input TR tube 31. At this point, the received beacon pulse is sample by directional coupler 33 and is applied to RF filter 41, to remove unwanted energy. It is then amplified by TWT 42 and mixed with the output of the IF frequency oscillator 44 in mixer 43. The two sidebands ($f_r$ + IF and $f_r$ − IF) which are developed are passed through the pilot-selected "Beacon" position of the Beacon/Radar switch 46 to the radar mixer 33. At the radar mixer 33, these two sidebands are mixed with the unsampled portion of the received beacon pulse to produce a pulse of energy equal to the IF frequency. This pulse is then processed in the standard radar manner and displayed in range and bearing without the attendant ground clutter and without the frequency instability, which might defeat the bombing run. The pilot, seeing the IP displayed on his radar scope, communicates by voice link to the forward observer who then provides the range and bearing of the target relative to the IP.

Although the above-described embodiment addresses itself to utilization of an existing X-band beacon, optimum effectiveness would be gained by fabricating a small beacon of conventional design to respond and transmit at both X and KV bands in order to accommodate all airborne radar systems.

Full radar operation can be instantly obtained by the pilot switching back to "Radar" from "Beacon," and since all radars would not be tuned to the same beacon frequency, interference would be minimized when multiple aircraft are employed in the search.

Second Embodiment

Figure 2:
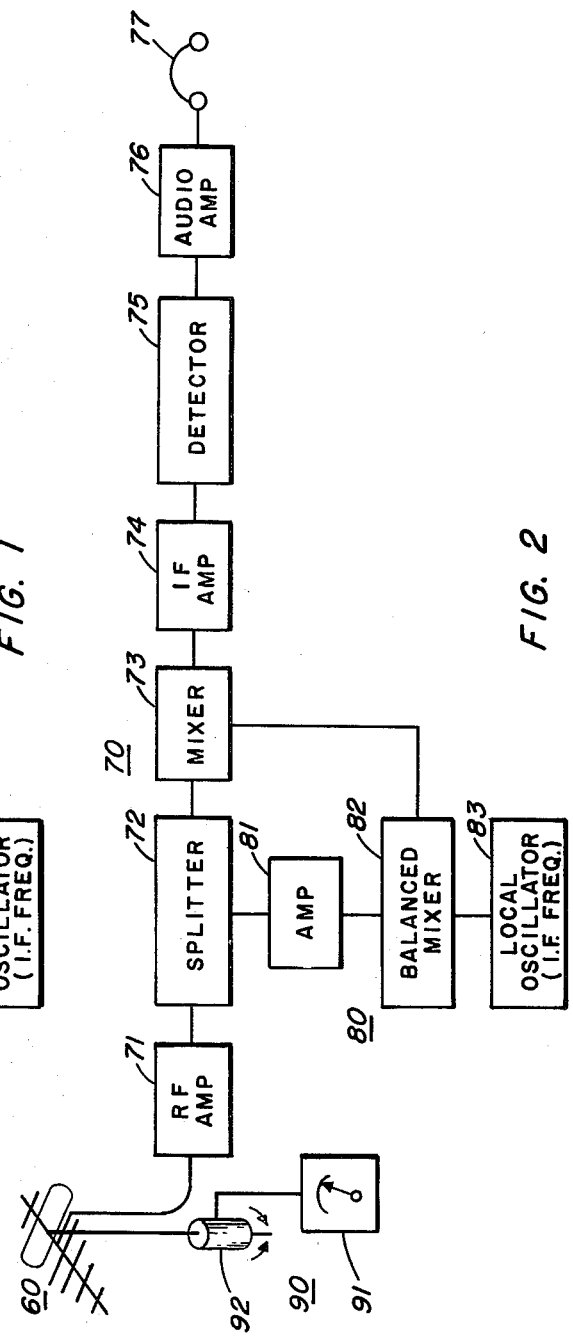
FIG. 2 illustrates still another radio receiver embodying the invention.

FIG. 2 illustrates a communication or broadcast frequency receiver embodying the invention. In this receiver, the radio frequency channel 70 receives signal from a broadband directional antenna 60. The antenna 60 is rotated by a conventional rotor system 90 having motor 92 and motor control means 91 for rotating antenna 60 clockwise or counterclockwise. The RF channel 70 includes a broadband RF amplifier 71, the output of which is fed to splitter 72 which applies the signal from antenna 60 to mixer 73 and to the heterodyne channel 80. The output of mixer 73 is applied to IF amplifier 74 which feeds detector 75 to provide output tone into audio amplifier 76 that can be heard by some suitable speaker or earphone means 77. The splitter directs a portion or sample of the received signal to a local oscillator channel 80 which amplifies the signal in an amplifier 81, the output of which is connected to balanced mixer 82.

A local oscillator 83 provides a signal to the balanced mixer having a fixed frequency the same as the IF frequency of the IF amplifier 74. Thus the receiving frequency from amplifier 81 is heterodyned in balanced mixer 82 to provide a double sideband having suppressed carrier with the same frequency as the received signal and one sideband having a frequency equal to the IF frequency plus the frequency of the received signal and another sideband having a frequency equal to the frequency of the received signal minus the IF frequency. This IF signal produced by mixer 73 is applied to the amplifier 74 with its amplitude modulation sidebands being detected in detector 75. The detected modulation is then amplified by amplifier 76.

In the embodiment of the invention shown in FIG. 2, a signal will be received by antenna 60 which results in the balanced mixer 82 applying double sideband signals to the mixer 73. The carrier frequency of these sideband signals will be equal to the frequency of the input signal. When these resultant signals are heterodyned or mixed with sidebands, described in the above paragraph, in mixer 73, the resultant signal from mixer 73 will be a signal having a frequency equal to the IF frequency with upper and lower modulation sidebands. These sidebands are amplitude-modulated at the audio frequencies and, when detected, will provide audio signals to earphone 77. Thus, regardless of the frequency of the received signal in the mixer, it will provide a signal having a frequency equal to IF frequency. The control 91 is rotated to rotate antenna 60 for maximum tone in earphone 77. This maximum indication could be accomplished by a meter rather than the headphone 77 or by a visual display such at CRT.

Obviously, many modifications and variations of the present invention are possible in the light of the above teachings. It is therefore to be understood that within the scope of the appended claims, the invention may be practiced other than as specifically described and illustrated.

What is claimed is:

1. Apparatus for processing an electromagnetic signal of unknown frequency comprising, in combination:

means for receiving said signal;

directing means for directing said signal into two channels;

first channel means comprising local oscillator means set at a predetermined IF frequency, and first mixer means receiving as inputs the output of said local oscillator means and the output of said directing means; and second channel means comprising second mixer means receiving as inputs the outputs of said first mixer means and said directing means, means connected to said second mixer means for amplifying signals of the IF frequency, detection means connected to said amplifier means for detecting its output signal, and means connected to said detecting means for utilizing said detected signal, said apparatus further including filter means connected between said directing means and said first mixer means for blocking the passage of signals in a narrow band of frequencies, and further including a radar local oscillator and single-pole, double-throw switch means, the pole of said switch being connected to one input of said second mixer means, one switch terminal being coupled to receive the output of said first mixer means and the other switch terminal being coupled to receive the output of said radar local oscillator, so that either the first mixer means or the radar local oscillator may be coupled to said second mixer means at any given time.

* * * * *